E. M. HESSELBOM.
STRAW-CUTTER.

No. 190,758. Patented May 15, 1877.

WITNESSES:
Chas. Nida
J. H. Scarborough

INVENTOR:
E. M. Hesselbom
BY
ATTORNEYS.

N. PETERS, PHOTO-LITHOGRAPHER, WASHINGTON, D. C.

UNITED STATES PATENT OFFICE.

ERIC M. HESSELBOM, OF RICEFORD, MINNESOTA.

IMPROVEMENT IN STRAW-CUTTERS.

Specification forming part of Letters Patent No. 190,758, dated May 15, 1877; application filed January 6, 1877.

*To all whom it may concern:*

Figure 1:
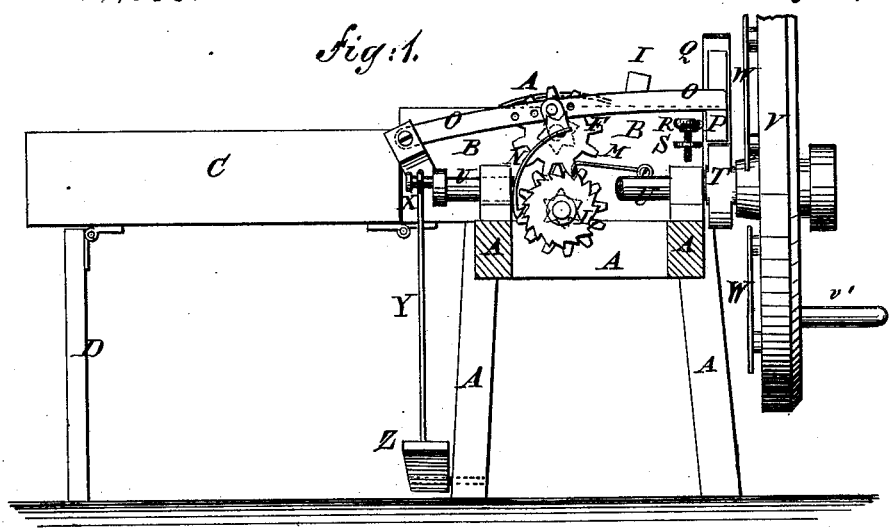
Figure 2:
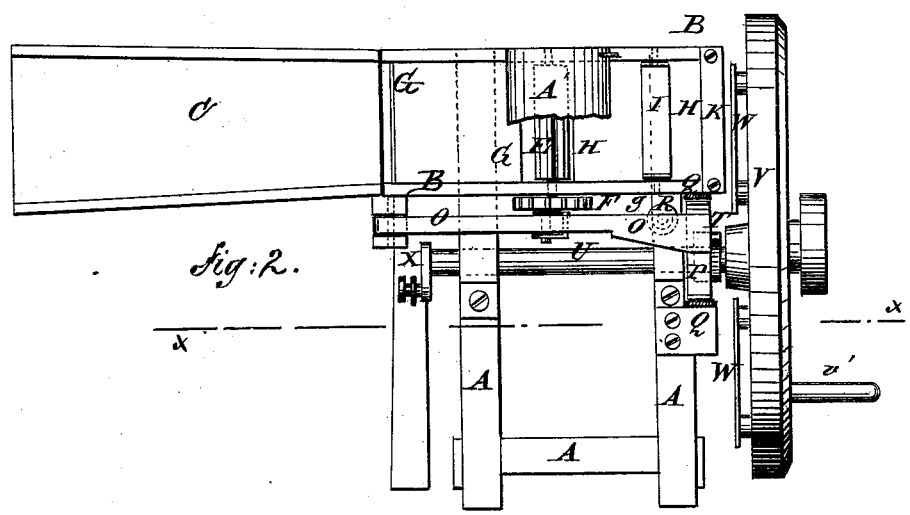
Figure 3:
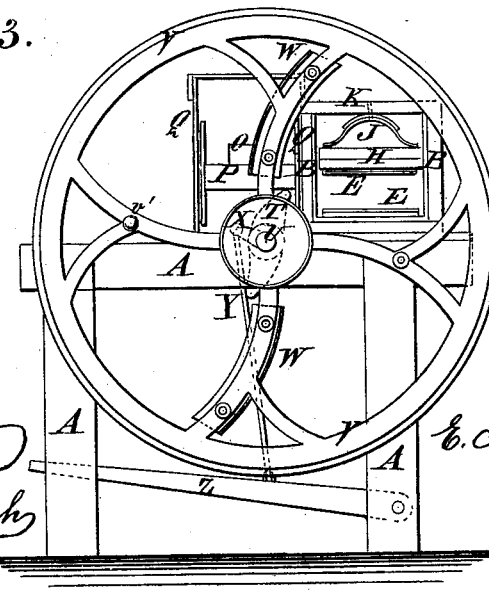

Be it known that I, ERIC M. HESSELBOM, of Riceford, in the county of Houston and State of Minnesota, have invented a new and useful Improvement in Straw - Cutters, of which the following is a specification:

Figure 1 is a side view of my improved straw-cutter, partly in section, through the line $x\ x$, Fig. 2. Fig. 2 is a top view of the same, part being broken away to show the construction. Fig. 3 is a front view of the same.

Similar letters of reference indicate corresponding parts.

The object of this invention is to furnish an improved machine for cutting straw and hay for feed for stock, which shall be so constructed that the straw or hay will not be fed forward when the knives are cutting, which may be readily adjusted to cut the feed coarse or fine, and which shall be simple in construction and convenient in use.

The invention consists in the construction and combination of parts, which will be hereinafter more fully described, and then pointed out in the claim.

A is the frame of the machine, to and across one end of which is secured the cutting-box B. With the rear end of the cutting-box B is connected the forward end of the feed-box C, the rear end of which is supported by a leg, D. The feed-box C may be hinged to the cutting-box B, and the leg D may be hinged to the feed-box C, so that the said feed-box can be turned down at the side of the frame A when the machine is not in use, to economize space.

In the upper and lower middle parts of the cutting-box B revolve the journals of two fluted rollers, E, which are connected by gear-wheels F attached to their said journals, so that they may revolve together and in opposite directions, to carry the straw or hay forward to be cut. To the sides of the cutting-box B, in the rear of the feed-rollers E, is attached an inclined board, G, to guide the straw or hay into the space between the said feed-rollers E. In the cutting-box B, in front of the feed-rollers E, is placed a board, H, to keep the straw or hay from expanding while passing from the said feed-rollers E to the forward end of the cutting-box B, and keep it compact while being cut. To the upper side of the board H is attached a bar, I, the ends of which are bent upward at right angles, and have a number of holes formed through them to receive the screws or bolts by which they are secured to the sides of the cutting-box B, so that the said board may be adjusted according to the desired thickness of straw or hay to be fed to the knives, and which depends upon the strength of the operator. The forward end of the board H is held down by a spring, J, attached to a cross-bar, K, secured to the top of the forward end of the cutting-box B, so that the said forward end of the said board H may adjust itself to the varying thickness of the feed.

The forward end of the cutting-box B may be lined with metal to prevent it from being worn by the friction of the straw or hay.

To the journal of the lower feed-roller E is attached a ratchet-wheel, L, with the teeth of which engage two pawls, M N. The pawl M is pivoted to the frame A or cutting-box B, and is designed to hold the ratchet-wheel L from being turned back by the friction of the working-pawl N. The pawl N is designed to turn the ratchet-wheel L, and thus turn the feed-rollers, and is pivoted to the lever O. The rear end of the lever O is pivoted to a bracket or other support attached to the rear part of the cutting-box B or frame A. The forward end of the lever O is attached to a cross-head, P, which moves up and down between guides Q attached to the frame A. The downward movement of the lever O is limited to regulate the rapidity of the feed by a set-screw, R, which is screwed through a screw-hole in an arm or bracket, S, attached to the cutting-box B or frame A, in such a position that the lever O may strike against the upper end or head of the said screw R. The cross-head P rests upon the cam T, attached to the shaft U that revolves in bearings attached to the frame A, and to its forward end is attached the knife-wheel V. The knife-wheel V is made heavy, so as to serve also as a fly-wheel, and to its arms are attached one or more knives, W. The knives W are secured to the wheel V by bolts, so that they may be adjusted closer to the end of the cutting-box B, to take up the wear. To the wheel V is attached a crank pin or handle, $v'$, to enable the machine to be operated by hand, when desired. To the rear end of the shaft U is attached a short crank, X, to which is pivoted the upper end of a connecting-rod, Y. The lower end of the connecting-rod Y is pivoted to the treadle Z, the end of which is pivoted to the frame A.

By this arrangement the machine can be operated with the foot, if desired.

The top of the upper roller E is covered by a hinged plate, A', to prevent the said roller from being clogged by straw or hay falling upon it, and to prevent the operator's fingers from being caught and injured by the said roller.

Having thus described my invention, I claim as new and desire to secure by Letters Patent—

The combination of the longitudinal end-pivoted lever O, having a front cross-head, P, and carrying a pawl, N, with the cutter-frame, having guides Q for the cross-head, the cutter-wheel shaft, provided with a cam, T, the geared feed-rollers E, and ratchet-wheel L, all constructed and relatively arranged as herein set forth.

ERIC M. HESSELBOM.

Witnesses:
GEORGE B. BLAESS,
HENRY GREMM.